A. C. RHODES.
FURNACE.
APPLICATION FILED JAN. 31, 1919.

1,336,980.

Patented Apr. 13, 1920.
3 SHEETS—SHEET 1.

Inventor
Albert C. Rhodes.
by Heard Smith & Tennant
Atty's

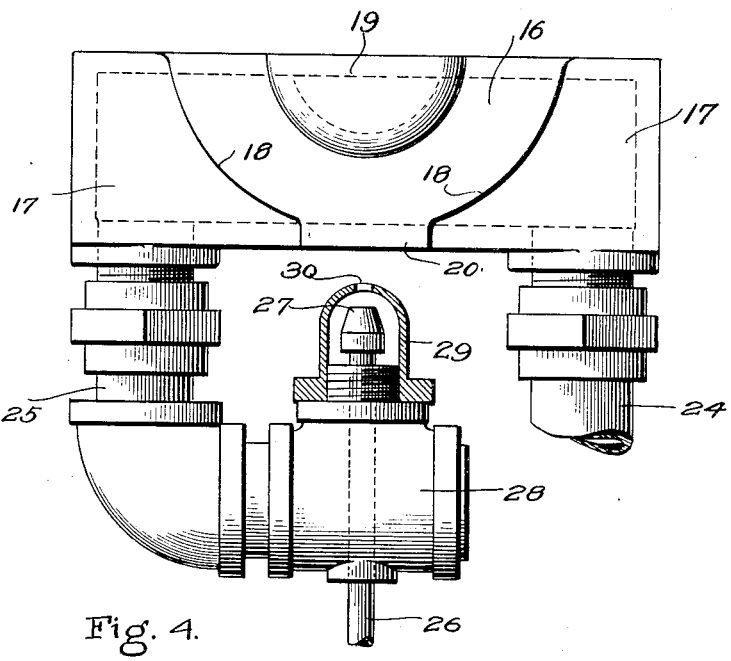
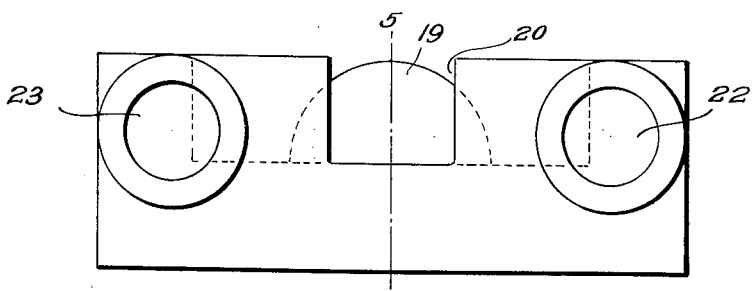
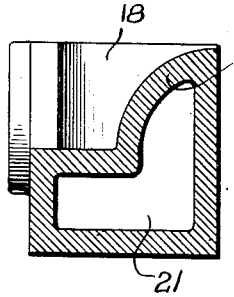

A. C. RHODES.
FURNACE.
APPLICATION FILED JAN. 31, 1919.

1,336,980.

Patented Apr. 13, 1920.
3 SHEETS—SHEET 3.

Inventor.
Albert C. Rhodes
by Heard Smith & Tennant
Attys.

UNITED STATES PATENT OFFICE.

ALBERT C. RHODES, OF HOPEDALE, MASSACHUSETTS, ASSIGNOR TO DRAPER CORPORATION, OF HOPEDALE, MASSACHUSETTS, A CORPORATION OF MAINE.

FURNACE.

1,336,980.  Specification of Letters Patent.  Patented Apr. 13, 1920.

Application filed January 31, 1919. Serial No. 274,203.

*To all whom it may concern:*

Be it known that I, ALBERT C. RHODES, a citizen of the United States, residing at Hopedale, county of Worcester, State of Massachusetts, have invented an Improvement in Furnaces, of which the following description, in connection with the accompanying drawing, is a specification, like characters on the drawing representing like parts.

This invention relates to furnaces in which the heat is generated by a mixture of air and liquid or gaseous fuel. One well known type of such furnaces is commonly employed for hardening or annealing metal.

In furnaces of this character the mixture of air and fuel is usually distributed or deflected into the heating chamber, where it ignites, by a baffle against which the mixture is projected from the burner. This baffle forms a part of a block which is usually built into the furnace and may be removed and replaced. In the operation of a furnace, having a common baffle brick, owing to the more or less imperfect combustion a deposit usually forms upon the baffle which rapidly builds up thereon, hinders distribution, and soon causes the baffle to break down under the irregular and varying heat. Furthermore, the imperfect distribution of the heat thus resulting throughout the furnace and the imperfect combustion of the fuel soon causes the brick lining of the furnace to be attacked and the slag resulting therefrom drips onto the floor of the furnace and the deposit thus formed builds up behind the baffle especially when as usual the floor is inclined. As soon as this deposit builds up behind the baffle the furnace goes to pieces very rapidly.

The result is that frequent replacement of the baffle block is required which is not only an expensive operation in itself but which also requires the shutting down of the furnace with the consequent loss of the use of the furnace. The result also is frequently to require the relining of the entire furnace which is a still more expensive operation and keeps the furnace out of use for a much longer time.

The object of the present invention is to provide for heating either the air or fuel prior to the mixing of the air and fuel in the nozzle. Thus without heating both components it is possible to produce a mixture which will give substantially perfect combustion. In this feature the invention is independent of the particular means employed for applying the heat either to the air or to the fuel prior to mixing in the nozzle.

The object of the present invention more specifically considered is to provide a baffle block so constructed as to permit the passage therethrough of the air on its way to the nozzle. This is found sufficient to result in such a cooling of the baffle and such a promotion of perfect combustion of the mixture that the desired results are secured.

The object of the present invention still more specifically considered is to provide a baffle block so constructed as to permit the passage therethrough of the fuel on the way to the burner. This also will be sufficient in some cases to secure the desired results.

The object of the invention is further to provide a baffle block so constructed as to permit the passage therethrough of either the air or the fuel or both on the way to the nozzle. In such a construction it is possible for the operator to pre-heat either the air, the fuel, or both as the particular conditions may require.

The invention has for its further object to provide a baffle plate of this character made of cast iron which may thus readily be formed to present a smooth and properly shaped deflecting surface and with which connections may be readily made to the air and fuel supplies, either or both, and to the nozzle.

These and other objects of the invention will appear more fully from the accompanying description and drawings and will be particularly pointed out in the claims.

The drawings represent an ordinary type of furnace suitable for hardening or annealing metal articles in which a preferred form of the invention has been embodied.

In the drawings,

Fig. 3 is a top plan view of one form of baffle block, mixing nozzle and connections, with a portion of the nozzle shown in horizontal cross section;

Fig. 4 is a front elevation of the baffle block;

Fig. 5 is a vertical cross section of the baffle block taken on the line 5—5, Fig. 4;

Figure 1:
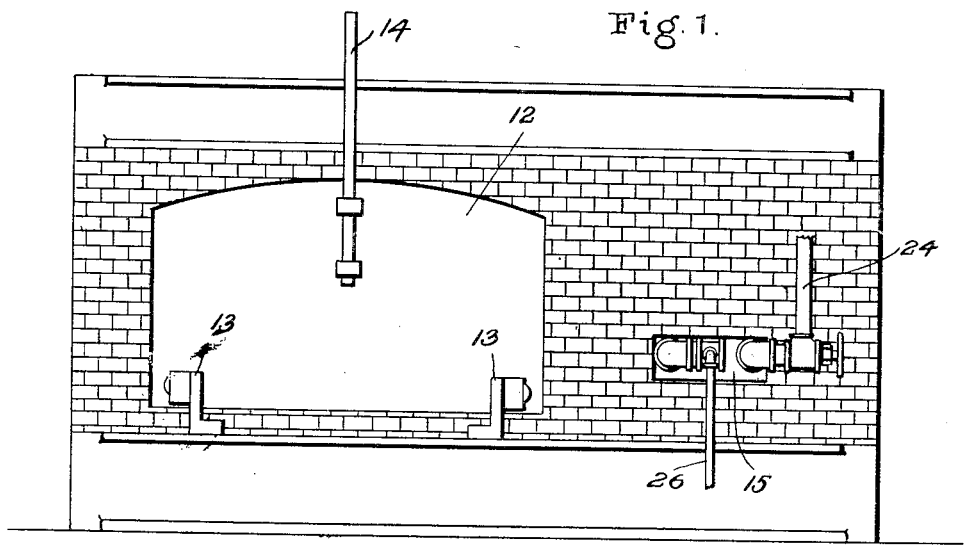
Figure 1 is a front elevation of the furnace.
Figure 2:
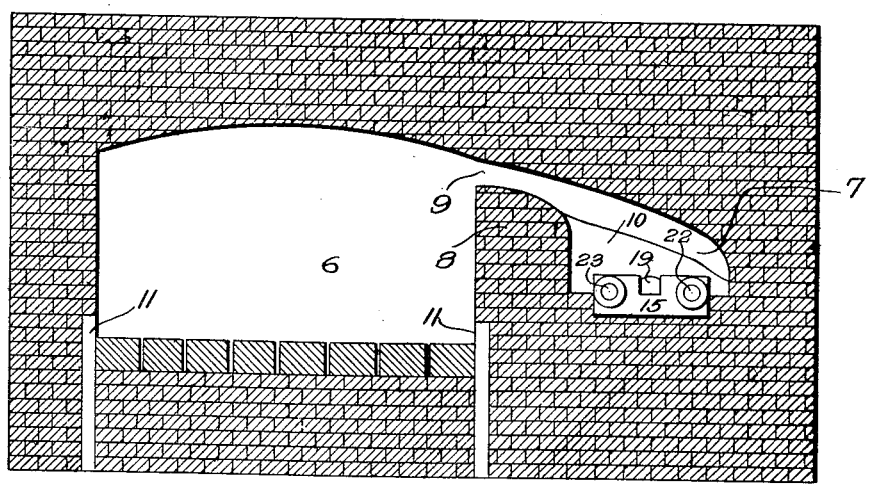
Fig. 2 is a transverse vertical cross section directly inside the front wall with the baffle block in elevation.

In its broader aspects the invention provides for heating the air alone before it is mixed with the fuel and passes out through the nozzle. Another form of the invention provides for heating the fuel alone before it is mixed with the air and passes out through the nozzle. Another form of the invention provides a suitable construction by which as required for the particular conditions either the air may be heated alone, the fuel may be heated alone, or both may be heated prior to passing out through the nozzle. In this respect the invention is distinguished from the furnaces wherein both the air and fuel are heated before mixing or wherein the mixture itself is heated before passing out of the nozzle.

The furnace herein is illustrated consequently simply for the purpose of disclosing a preferred construction for embodying the present invention.

A hardening or annealing furnace such as illustrated may be and usually is a built-up structure of brick and iron and is herein shown as of generally rectangular form. The walls of the furnace inclose the main heating chamber 6, the length of which from front to rear may vary as desired.

The combustion chamber 7 is in this form of furnace located at the side of the heating chamber, is separated therefrom by a partition wall 8 and opens thereinto through the opening 9 at the top. The floor 10 of the combustion chamber slopes upward rearwardly so that the combustion chamber tapers back from the front of the furnace.

Suitable exit flues 11 are provided usually at the four corners of the heating chamber and communicate with a suitable stack.

The heating chamber 6 is provided at the front with a suitable door 12 hinged at 13 and having a handle 14.

In these furnaces the fuel is commonly a mixture of air and oil fed under pressure to a nozzle from which the mixed air and oil in a somewhat atomized state issues and is burned at the front of the combustion chamber. The flame from the baffle passes the length of the combustion chamber, being deflected up as its force diminishes by the floor 10. The flame passes laterally through the opening 9 into the heating chamber and the heat directed more or less by the curved upper wall of the heating chamber fills the entire space in the heating chamber.

All the inner surfaces of the combustion and heating chambers are preferably lined with fire brick. So long as there is perfect combustion of the mixed oil and air and so long as there is an even and steady distribution of the heat in the combustion chamber and consequently of the heat in the heating chamber the fire brick lining will be slow in deteriorating. If, however, the combustion be imperfect so as to produce deposits upon the surfaces touched by the flame and if the heat be unevenly distributed the situation is at once changed and the fire brick especially in the combustion chamber begins to break down and the dripping slag falling on the inclined floor 10 gradually clogs the combustion chamber and the lining rapidly goes to pieces.

The mixture of air and fuel is fed from the nozzle onto a baffle which acts to deflect and thus distribute the mixture in the required manner in the combustion chamber and a baffle having an exterior semi-hemispherical deflecting surface as illustrated has been found an efficient means for deflecting or distributing the mixture in the required manner.

This baffle is part of a block usually of a generally rectangular shape which is set into the wall of the furnace at the front of the combustion chamber.

The baffle block 15 which is shown separately in Figs. 3, 4 and 5 is of general rectangular shape and is preferably made of cast iron but other suitable materials may be used. In the form illustrated a semi-circular recess 16 is provided in the top of the baffle block leaving at each end guards 17 having the vertical cylindrical surfaces 18 and also leaving at the center the baffle 19. This baffle is preferably as shown of the shape of a semi-hemisphere.

An opening 20 is formed through the front wall of the block into the recess 16 directly opposite the baffle 19.

The baffle block is formed with an interior chamber 21 which chamber extends up into the baffle 19 and this chamber also extends up at the ends into the guards 17. At suitable points preferably on the front face of the block an air admission opening 22 and an air exit opening 23 are provided so that air may enter the chamber, pass therethrough and out therefrom. This passage of air through the baffle block and consequently through the baffle acts to abstract heat from the baffle and maintain it cool.

A suitable conduit or pipe 24 is connected to the baffle block at the opening 22 and another suitable conduit or pipe 25 is connected to the baffle block at the opening 23.

The fuel nozzle may be connected to the conduit 25 and is shown as of an ordinary type the details of which form no part of the invention. In this nozzle fuel such as oil is supplied to the pipe 26 under pressure and passes out at the nozzle 27. The air passes from the conduit 25 into the head 28, which surrounds the pipe 26, and from this head passes out concentric with the nozzle 27 into the cap 29 and out through the opening 30. The action is similar to that of an injector. The air being under pressure and the fuel preferably being under pressure the two are intermingled and pass out in a jet of atomized mixture from the opening 30. This opening is placed directly opposite the baffle 19 so that the mixture striking the baffle is deflected thereby and the flame is distributed through the combustion chamber and from thence the heat is distributed through the heating chamber.

The air fed to the nozzle it will be noted has first passed through the baffle block and in absorbing heat from the baffle has itself become heated so that when it mixes with the fuel in the nozzle the combustion is rendered more perfect.

The distribution of the heat is also assisted by the deflecting surfaces 18 of the recess 16 and as the guards 17 upon which these surfaces are formed also are chambered and communicate with the chamber 21 further heat is passed through these surfaces into the air as it passes through the block.

Thus not only the time, labor and expense required to replace the baffle in a furnace is very materially reduced but also the time, labor and expense required to replace the lining is very materially reduced, and what is of still greater importance, the loss to the industry by reason of the furnace remaining idle is reduced to a small amount.

Figure 6:
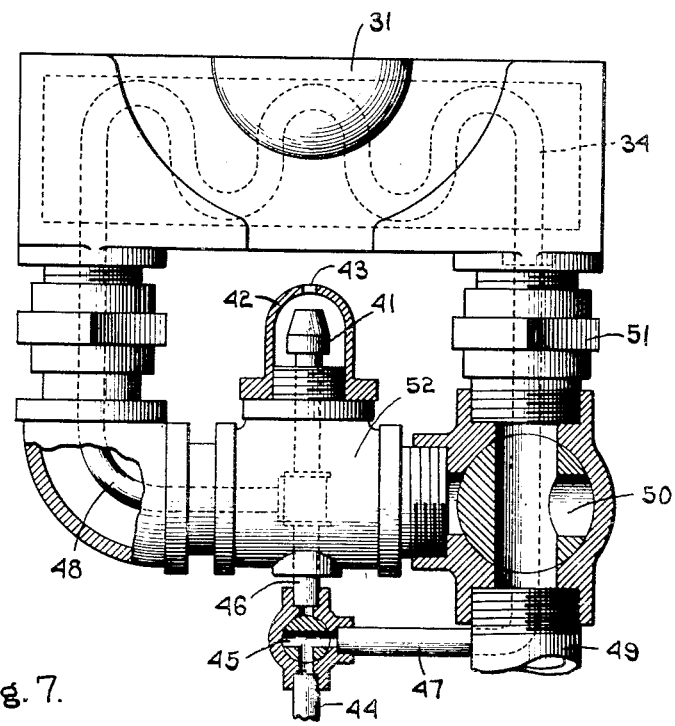
Fig. 6 is a top plan view of another form of baffle block, mixing nozzle and connections with portions of the construction shown in horizontal cross section.
Figure 7:
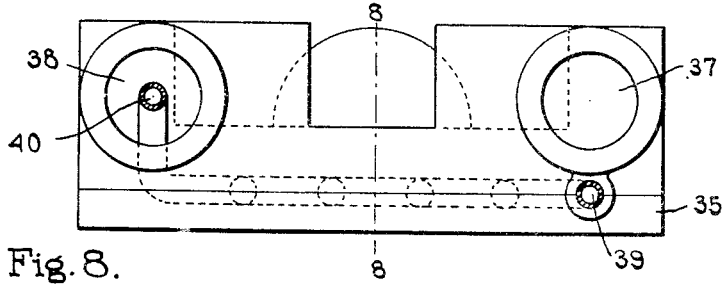
Fig. 7 is a front elevation of this second form of baffle block.
Figure 8:
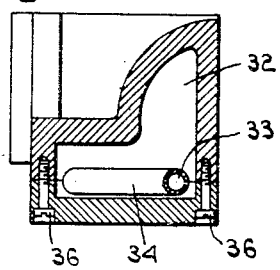
Fig. 8 is a vertical cross section taken on the line 8—8 of Fig. 7.

A further form of baffle block and connections in which the invention may be embodied is shown in Figs. 6, 7 and 8. In this construction provision is made for heating the fuel by passing it through the interior of the baffle. This construction also provides for passing the air through the interior of the baffle as in the form already described. This construction also further provides means by which either the air, the fuel or both as required or as may be desired may be heated before passing through the nozzle.

The baffle block is shown of general shape and construction similar to that already described and as having a similar semi-hemispherical baffle 31. The interior is divided into two chambers, namely, the air chamber 32 and the fuel chamber 33. This division may be formed in any convenient manner and is shown as formed by inserting a pipe 34 into the interior of the baffle block so that the interior of this pipe may form the fuel chamber. In order conveniently to do this the baffle block may have a separable bottom 35 secured in place by screws 36.

As before, at suitable points preferably on the front face of the block air admission and air exit openings are provided and in addition fuel admission and fuel exit openings are provided. The air admission opening 37 and the air exit opening 38 may be of a similar character as that already described and the fuel admission opening 39 and the fuel exit opening 40 may be where the pipe 34 passes into and out of the baffle block.

A similar type of nozzle as already described is shown comprising the fuel nozzle 41 and the cap 42 so arranged that the mixture of air and fuel passes out through the opening 43 and is directed against the baffle 31. The fuel supply pipe 44 is shown as provided with a three-way valve 45 connecting the pipe 44 either with the pipe 46 leading to the nozzle or with the pipe 47 leading to the pipe 34 forming the chamber 33 in the baffle block. This pipe 47 preferably passes beneath the opening 37. The pipe 34 however is shown as leaving the baffle block concentrically of the opening 38 and in its section 48 passes through the air pipe and joins the pipe 46.

The air conduit or pipe is connected to the opening 37, 38. The main air supply pipe 49 connects with a three-way valve 50 which at one end is connected by a union 51 to the admission opening of the baffle block and at the other end to the head 52. This head which surrounds the fuel pipe 46 and terminates at one side of the nozzle is connected at the other end to the exit opening 38 of the baffle block.

It will thus be seen that by turning the three-way valve 45 to cause the pipe 44 to connect with the pipe 46 and by turning the three-way valve 50 to the position shown in Fig. 6 that the air alone will be passed through the interior of the baffle block and the same conditions will prevail as already described in connection with the construction shown in Figs. 3, 4 and 5.

If the three-way valve 45 be turned to the position illustrated in Fig. 6 then the fuel will also pass through the interior of the baffle block and thus both components of the mixture will be heated. If it is desired to heat the fuel alone then the three-way valve 45 will remain in the position illustrated in Fig. 6 and the three-way valve 50 will be turned to connect the supply pipe 49 directly with the head 52 and shut off the admission of air to the interior of the baffle block.

Having fully described my invention, what I claim as new and desire to secure by Letters Patent is:

1. A self contained removable baffle block for a furnace having a baffle projecting from the body thereof presenting a convex exterior deflecting surface, an interior chamber extending into said projecting baffle, and air admission and exit openings into and from said chamber, whereby air in its passage through the chamber abstracts heat from the baffle thus cooling the baffle and heating the air.

2. A self contained removable baffle block for a furnace having a semi-circular recess in one face producing a central baffle projecting from said face having an exterior deflecting surface and end guards also projecting from said face presenting deflecting surfaces, an interior chamber extending into said baffle and end guards, and air admission and exit openings into and from said chamber, whereby air in its passage through the chamber abstracts heat from the baffle and end guards.

3. In a heating furnace, a fuel and air mixing nozzle, means for conducting air and fuel to the mixing nozzle, and means for pre-heating the air alone or the fuel alone as required in its passage to the nozzle.

4. In a heating furnace, a fuel and air mixing nozzle, means for conducting air and fuel to the mixing nozzle, and means for pre-heating either the air alone, either the fuel alone, or both the air and fuel in its or their passage to the nozzle.

5. A baffle block for a furnace having a baffle presenting an exterior deflecting surface and having a plurality of interior chambers, air admission and exit openings into and from one of said chambers, and fuel admission and exit openings into and from another of said chambers, whereby either air or fuel or both may be passed through the interior of the baffle block.

6. A baffle block having a baffle presenting an exterior deflecting surface and having a plurality of interior chambers, means for directing the passage of either air through one of said chambers or fuel through another of said chambers, or both air and fuel through their respective chambers as required.

7. A baffle block having a baffle presenting an exterior deflecting surface, and means for directing the passage of the air or the fuel, or the air and fuel simultaneously but separately through the interior of the baffle block before it or they are mixed for combustion.

In testimony whereof, I have signed my name to this specification.

ALBERT C. RHODES.